(12) United States Patent
Kluge et al.

(10) Patent No.: US 12,221,997 B2
(45) Date of Patent: Feb. 11, 2025

(54) TUBULAR SLEEVE

(71) Applicant: ILLINOIS TOOL WORKS INC., Glenview, IL (US)

(72) Inventors: Martin Kluge, Röttingen (DE); Bruno Da Rocha, Altena (DE); Stefan Helbert, Witten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 239 days.

(21) Appl. No.: 17/685,509

(22) Filed: Mar. 3, 2022

(65) Prior Publication Data

US 2022/0282751 A1    Sep. 8, 2022

(30) Foreign Application Priority Data

Mar. 5, 2021   (DE) ................. 10 2021 105 346.3 U
Feb. 18, 2022  (DE) ..................... 10 2022 103 924.2

(51) Int. Cl.
*F16B 41/00*    (2006.01)

(52) U.S. Cl.
CPC ................. *F16B 41/002* (2013.01)

(58) Field of Classification Search
CPC ...... F16B 41/002; F16B 5/0258; F16B 19/02; H02G 3/22; B60R 16/0222; F16L 5/00
USPC .............................. 411/444, 339, 999; 16/2.1
See application file for complete search history.

(56) References Cited

U.S. PATENT DOCUMENTS

| | | | | |
|---|---|---|---|---|
| 934,960 A | * | 9/1909 | Dreibuss ................ | A01B 33/06 411/339 |
| 2,797,605 A | * | 7/1957 | Metze, Jr. ............... | F16B 33/02 402/48 |
| 3,091,795 A | * | 6/1963 | Budwig .................. | F16L 5/027 439/550 |
| 3,647,306 A | * | 3/1972 | Chamberlin ............ | B42F 13/28 402/48 |
| 4,640,654 A | | 2/1987 | Fischer et al. | |
| 4,819,954 A | * | 4/1989 | Fucci ..................... | F16B 41/002 277/640 |
| 4,883,319 A | * | 11/1989 | Scott ........................ | B60N 2/22 403/162 |
| 5,094,563 A | * | 3/1992 | Carletti ................... | F16B 9/056 403/194 |
| 5,104,141 A | * | 4/1992 | Grove ..................... | B62D 17/00 280/86.753 |
| 5,280,138 A | * | 1/1994 | Preston ................... | H02G 1/08 174/136 |
| 5,529,412 A | * | 6/1996 | Jadrich ................... | B41J 19/20 400/354.1 |
| 6,623,226 B2 | * | 9/2003 | Braun ................... | F16B 41/002 411/970 |

(Continued)

FOREIGN PATENT DOCUMENTS

DE   102018117435 A1   1/2019
EP        0163152 A1   12/1985

(Continued)

*Primary Examiner* — Flemming Saether
(74) *Attorney, Agent, or Firm* — THOMPSON HINE LLP (57) ABSTRACT

A tubular sleeve is provided, in particular for use as a force-absorbing sleeve. The sleeve includes a casing wall having a through-opening, wherein the sleeve is formed from plastic, and a modulus of elasticity of the plastic is between 15,000 MPa and 25,000 MPa.

15 Claims, 4 Drawing Sheets

(56) References Cited

U.S. PATENT DOCUMENTS

| | | | |
|---|---|---|---|
| 6,843,630 B2* | 1/2005 | Sbongk | F16B 21/16 |
| | | | 24/453 |
| 7,114,901 B2* | 10/2006 | Maruyama | F16B 5/0208 |
| | | | 411/546 |
| 7,370,878 B2* | 5/2008 | Nakazawa | B60R 21/213 |
| | | | 16/2.5 |
| 10,393,165 B2* | 8/2019 | Kulzer | B32B 15/20 |
| 2002/0054807 A1 | 5/2002 | Hartmann | |
| 2002/0106257 A1 | 8/2002 | Braun | |
| 2019/0024696 A1 | 1/2019 | Friedrich | |
| 2022/0356839 A1* | 11/2022 | LaBelle | F02C 7/045 |
| 2023/0055198 A1* | 2/2023 | Yue | F16D 43/206 |
| 2024/0077097 A1* | 3/2024 | Klassen | F16B 43/00 |

FOREIGN PATENT DOCUMENTS

| | | |
|---|---|---|
| EP | 1205676 A2 | 5/2002 |
| EP | 1229257 A2 | 8/2002 |
| WO | WO 0032947 A1 | 6/2000 |
| WO | WO 02088555 A1 | 11/2002 |
| WO | WO 2019145553 A1 | 8/2019 |

\* cited by examiner

TUBULAR SLEEVE

TECHNICAL FIELD

The present invention relates to a tubular sleeve.

BACKGROUND

WO 02/088555 A1, DE 10 2018 117 435A1, WO 2019/145553 A1, EP 1 205 676 A2, EP 1 229 257 A2, EP 0 163 152 A1, and WO 00/32947 A1 describe fastening means and fastening systems having a tubular sleeve.

The problem addressed by the present invention is to provide an alternative to sleeves known from the prior art.

A further problem addressed is to provide a sleeve that is safe and reliable in operation.

In addition, a problem addressed by the present invention to provide a sleeve that is easy to produce.

SUMMARY

According to the invention, a tubular sleeve is provided, in particular for use as a force-absorbing sleeve. The sleeve comprises a casing wall having a through-opening, wherein the sleeve is formed from plastic, and a modulus of elasticity of the plastic is between 15,000 MPa and 25,000 MPa.

In the context of the present invention, a tubular sleeve is understood to mean a compression-limiting sleeve and/or a spacer sleeve.

In the field, the modulus of elasticity is also referred to as the E-modulus, tensile modulus, coefficient of elasticity, elongation modulus, or Young's modulus. The modulus of elasticity is a material characteristic value from material technology and describes the proportional relationship between stress and elongation in the deformation of a solid body in linear-elastic behavior.

The modulus of elasticity of the plastic can be at least 10,000 MPa or at least 11,000 MPa or at least 12,000 MPa or at least 13,000 MPa. The modulus of elasticity of the plastic can be at most 17,000 MPa or at most 18,000 MPa or at most 19,000 MPa or at most 20,000 MPa.

Compared to sleeves made of metal, a sleeve made of plastic has the advantage that it does not cause any corrosion in a fastening region, in particular in conjunction with a screw made of metal.

Furthermore, a sleeve made of plastic can be produced in a simple manner, for example by means of an injection-molding process.

The sleeve can have a resistance to heat deformation of up to 285° C. The functional temperature range under load can be between −40° C. and 125° C.

The tubular sleeve can be resistant to heat deformation, i.e. durable, in this functional temperature range up to at least −40° C. or up to at least −30° C. or up to at least −20° C. or up to at least −10° C. The tubular sleeve can be resistant to heat deformation, i.e. durable, in this functional temperature range up to at most 120° C. or at most 115° C. or at most 110° C.

Thus, the tubular sleeve can in particular be provided for use in an engine compartment of a motor vehicle.

Such a temperature range corresponds to technical specifications for the use of components in an engine compartment of a motor vehicle. The inventors of the present invention have recognized that metallic sleeves can also be replaced by tubular plastic sleeves according to the invention which nonetheless meet the mechanical specifications and the specifications for heat resistance.

Heat- or temperature-resistance is defined as the resistance of the tubular sleeve against high temperatures. If the temperature of the material reaches the so-called upper use temperature, the temperature-dependent properties change so strongly that the material no longer meets the mechanical specifications or is destroyed. The duration of the temperature effect also plays a role in this.

For example, the sleeve can be used in order to secure a valve hood, oil pan, suction module, or the like.

The plastic can preferably be a semi-aromatic polyamide, with or without glass fiber content.

The fiber content can range from 20 vol. % to 60 vol. %. In this case, the glass fiber content can be at least 5 vol. % or at least 10 vol. % or at least 15 vol. % or at least 20 vol. % or at least 25 vol. % or at least 30 vol. %. In addition, the fiber content can be at most 35 vol. % or at most 40 vol. % or at most 45 vol. % or at most 50 vol. % or at most 60 vol. % or at most 65 vol. %.

The semi-aromatic polyamide can be, for example, PPA, PA6/6T, PA6/6I, PA69T, PPS, PPSU, PSU or any other suitable polyphthalamide. Polyphthalamides (PPA, partially aromatic polyamides, semi-aromatic polyamides) are semi-crystalline aromatic polyamides (PA). They are semi-aromatic polyamides in which the amide groups are bonded alternately to aliphatic groups (—R) and benzene dicarboxylic acid groups. They belong to the class of thermoplastics.

Due to its semi-aromatic structure, polyphthalamide is a semi-crystalline material with a high melting point and a high glass transition temperature of up to over 150° C. The glass transition temperature increases with the terephthalic acid content. Polyphthalamides have a high resistance to heat deformation of more than 280° C.

The highly stiff material has a high tensile strength and rigidity. The modulus of elasticity (E modulus) of fiberglass-reinforced PPAs can be up to 20,000 MPa. The notched impact strength is higher than in comparable plastics. The constant mechanical properties with dimensional stability, little warpage, and high creep strength allow for uses over a wide range of applications.

In addition, the aforementioned materials or plastics, in particular PPA, are also radiation-crosslinked.

In the radiation-crosslinking, a special additive is added to the raw material. After processing the raw material, the plastic moldings are then irradiated after the fact. These jets cause chemical reactions and improve the mechanical and thermal properties of the plastic by better cross-linking (significant reduction in creep behavior, especially at high temperatures).

Furthermore, the through-opening can be configured in order to receive screws having a screw size of M5 to M8, wherein a biasing force is in the range of between 5 kN and 25 kN.

With a screw having a screw size M4 or smaller, the clamping force required is usually so low that often no bushing or sleeve is used. With screws having a screw size larger than M8, too large biasing forces would be necessary, meaning that, in the case of the plastic sleeve, too much plastic would flow away.

Using an M6 screw and a strength class of 8.8, the tubular sleeve according to the invention allows for a biasing force of approximately 7 to 9 kN.

Data for M6/strength class 8.8:
Tightening torque 8 to 10.5 Nm
Resulting biasing force approximately 7 to 9 kN With an M8 screw having a strength class of 10.9, a biasing force of approx. 23 kN is possible.

M5—Biasing force at strength class of 10.9: 10 kN

M7—Biasing force at strength class of 10.9: 21 kN

Ribs extending in the axial direction of the sleeve can be formed on an outer side of the casing wall of the sleeve.

These ribs preferably extend over nearly the entire length of the sleeve in the axial direction.

The ribs can be configured in order to stiffen the sleeve and/or form an anti-rotation feature when the sleeve is arranged in a corresponding component.

An anti-rotation feature is particularly advantageous in the production of a component having a sleeve according to the invention when the sleeve and the component are produced in a 2-component injection-molding process or when the sleeve is retrofitted.

By means of the ribs, a reduction of the axial load and/or an increase of the retaining force of the sleeve in a corresponding component recess is possible.

In the through-opening of the sleeve, a radially circumferential and inwardly radially extending collar for retaining a screw can be formed.

Such a collar ("bottleneck") allows for the securing of the transport of a screw arranged in the through-opening of the sleeve and/or a corresponding pre-assembly positioning of a screw.

The sleeve can have a radially extending annular contact portion at one end and/or at both ends.

The contact portion is provided for abutting a screw head of a screw and/or a component surface in order to distribute and dissipate the forces occurring.

Furthermore, one or more radially circumferential grooves can be provided on the casing wall.

The sleeve can be formed in two parts from two identical sleeve elements.

In the context of the present invention, two identical sleeve elements are understood to be symmetrical or self-complementary in configuration. This allows for a simple construction, because the tubular sleeve can be formed inexpensively from two identical parts.

The sleeve elements can comprise anti-rotation elements extending in an axial direction in the region of the through-opening.

By providing corresponding anti-rotation elements, a rotation of the two anti-rotation elements towards one another about the axial direction is safely and reliably prevented. In particular in the installed state, this allows for safe and reliable use.

Furthermore, the sleeve elements can be connected to one another via connecting means in order to form the sleeve.

By connecting the sleeve elements to one another via connecting means, the sleeve can be more easily pre-assembled.

In addition, according to the present invention, a fastening system is provided, with a sleeve described above and a screw having a screw size between M5 and M8.

As described above, in such a fastening system, screws can be arranged in the through-opening of the sleeve for anti-loss (transport-safe) and/or (pre-)assembly positioning purposes.

On a screw shank of the screw, a portion having a diameter that is increased with respect to the screw shank can be configured as an anti-loss feature, wherein the portion comprises a knurling or a ring element or a cross-portion that is reduced with respect to the screw thread.

By means of a corresponding portion on the screw shank with an enlarged diameter, the screw can be arranged in an anti-loss manner in the through-opening of the sleeve.

In addition, according to the present invention, a method for assembling a component in an engine compartment of a motor vehicle is provided, wherein a sleeve as described above is used for assembling the component.

In particular, the sleeve according to the invention is provided in applications in which the fastening means are exposed to high temperatures and/or high stresses.

According to the invention, a method for producing a component in a two-component injection-molding process is also provided, wherein firstly a sleeve as described above is injection-molded with ribs extending in the axial direction of the sleeve on an outer side of the casing wall, and thereafter the sleeve is over-molded in the region of the ribs, in order to position it securely on a component.

A fixed positioning is preferably understood to mean an anti-rotation arrangement when over-molding the sleeves.

In this way, a component can be easily produced, wherein the sleeve is anchored securely and reliably to the component.

An anti-rotation feature is thus formed by the ribs extending in the axial direction.

A multi-component injection-molding process in the context of the present invention is understood to mean a production of injection-molded parts consisting of two or more different plastics. Different materials and thus different properties can also be combined in a targeted manner.

There are various methods, all of which have in common that injection-molding machines having two or more injection units but only one clamping unit are needed. The parts can thus be produced inexpensively with only one tool in one operation. The injection units must operate in a harmonizing manner, but must always be independently controllable. The components can be injected through a single special nozzle or introduced into the tool at various locations.

BRIEF DESCRIPTION OF THE DRAWINGS

The present invention will be described in further detail below on the basis of the exemplary embodiments shown in the figures. The figures show.

DETAILED DESCRIPTION

Figure 1:
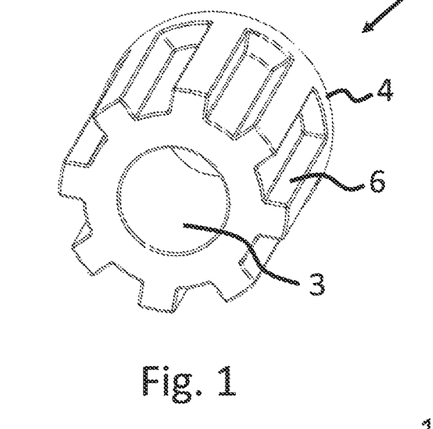
FIG. 1 a perspective view of a tubular sleeve according to the invention.
Figure 2:
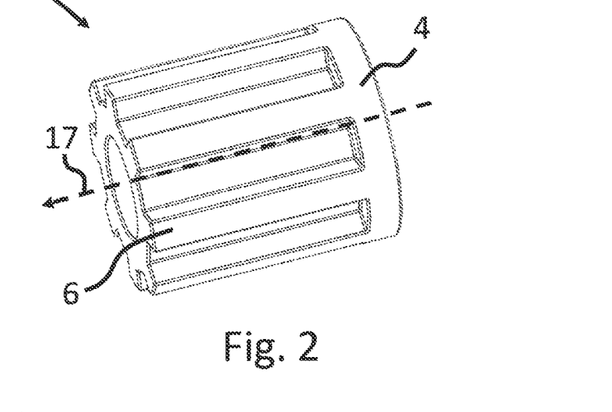
FIG. 2 a further perspective view of the tubular sleeve from FIG. 1.

In the following, a tubular sleeve 1 according to the invention is briefly described according to a first exemplary embodiment (FIGS. 1 and 2). The technical features of the exemplary embodiments can be combined as desired with one another, insofar as technically possible.

The tubular sleeve 1 is provided for use as a force-absorbing sleeve.

In addition, the tubular sleeve is formed from a plastic that relaxes only a little in a temperature range of −40° C. to 125° C. Typically, temperatures of −40° C. to 125° C. can occur in an engine compartment of an automobile. This corresponds to the common temperature ranges for an engine compartment of an automobile.

The tubular sleeve 1 comprises a base body having a casing wall 2, in which a through-opening 3 extending in an axial direction 17 is formed.

At one end of the base body of the sleeve 1, an approximately annular contact portion 4 for abutment on a component surface or a screw head is provided.

Furthermore, radially outwardly extending and longitudinally extending ribs 6 are provided on the casing wall 2.

Figure 3:
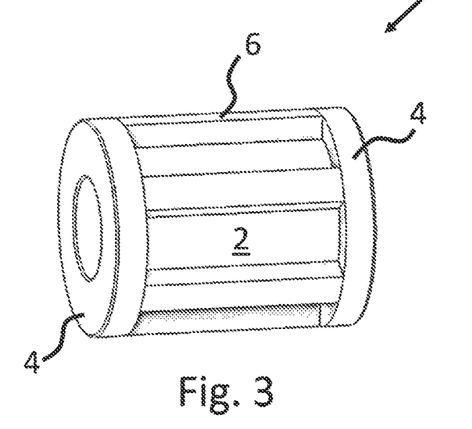
FIG. 3 a perspective view of the tubular sleeve according to a second embodiment, FIG. 4 a further perspective view of the tubular sleeve from FIG. 3, FIG. 5 a perspective view of the tubular sleeve according to a third embodiment, FIG. 6 a further perspective view of the tubular sleeve from FIG. 5, FIG. 7 a laterally cut view of a tubular sleeve according to a fourth embodiment, FIG. 8 a perspective partially laterally cut view of a component having a tubular sleeve and a screw from FIG. 7, FIG. 9 a perspective laterally cut view of the component having the tubular sleeve and a screw from FIG. 7, FIG. 10 a perspective view of a tubular sleeve according to a fifth embodiment, FIG. 11 a laterally cut view of the tubular sleeve from FIG. 10, FIG. 12 a perspective view of a screw having an anti-loss feature according to a first exemplary embodiment, FIG. 13 a perspective view of a screw having an anti-loss feature according to a second exemplary embodiment, FIG. 14 a perspective view of a screw having an anti-loss feature according to a third exemplary embodiment, FIG. 15 a perspective view of a tubular sleeve according to a sixth exemplary embodiment, FIG. 16 a perspective exploded view of the sleeve from FIG. 15, FIG. 17 a further perspective exploded view of the sleeve, FIG. 18 a perspective view of a sleeve element of the tubular sleeve, and FIG. 19 a perspective plan view of anti-rotation elements of the sleeve.
Figure 4:
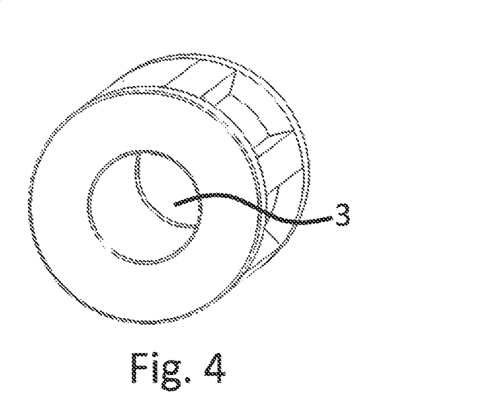

In the following, a tubular sleeve 1 according to a second exemplary embodiment is described (FIGS. 3 and 4). Unless described otherwise, the tubular sleeve 1 according to the second exemplary embodiment has the same technical features as the tubular sleeve 1 according to the first exemplary embodiment.

According to the second exemplary embodiment, it is provided that the tubular sleeve 1 comprises a contact portion 4 at both ends lying in the axial direction 5.

Figure 5:
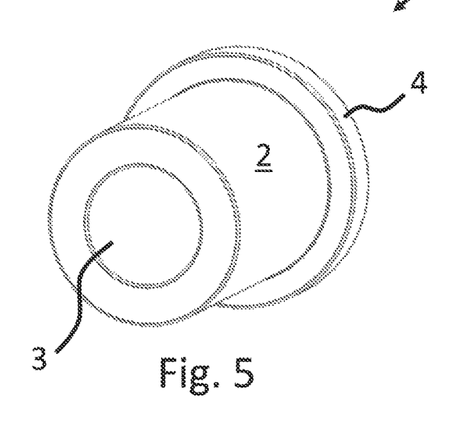
Figure 6:
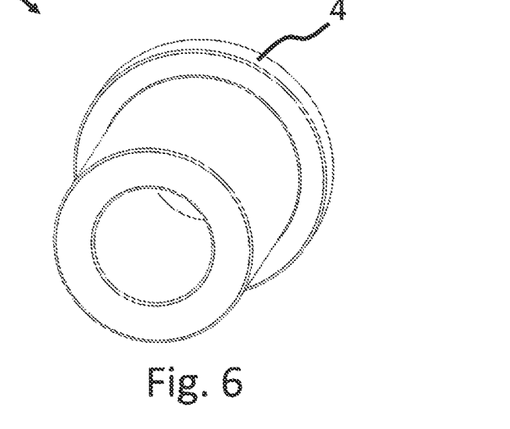

In the following, a tubular sleeve 1 according to a third exemplary embodiment is briefly described (FIGS. 5 and 6). Unless described otherwise, the tubular sleeve according to the third exemplary embodiment has the same technical features as the tubular sleeve 1 according to the first and second exemplary embodiments.

The tubular sleeve 1 according to the third exemplary embodiment is configured like the tubular sleeve 1 according to the first exemplary embodiment, wherein no ribs are provided on the casing wall 2, and accordingly the latter is flat or smooth in configuration.

Figure 7:
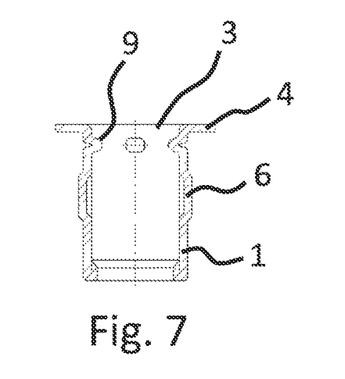
Figure 8:
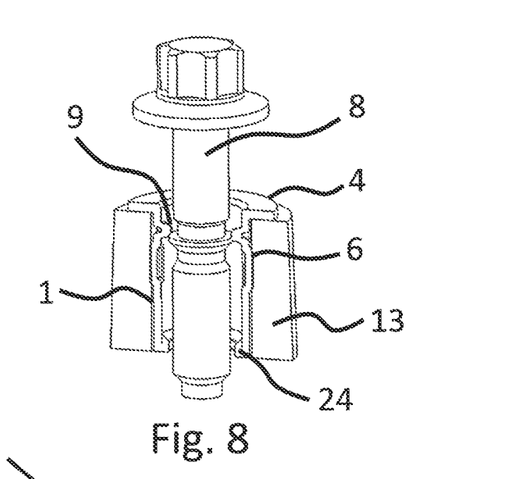
Figure 9:
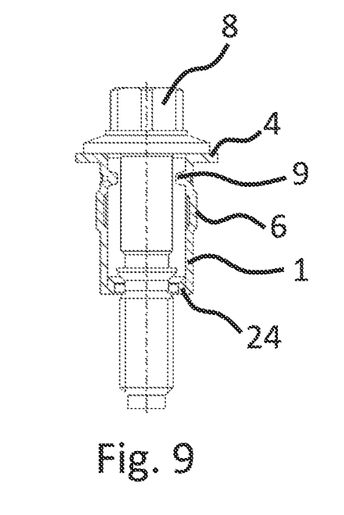

Furthermore, according to the present invention, a fastening system 7 is provided (FIGS. 8 and 9). The fastening system comprises a tubular sleeve 1 (FIG. 7) and a screw 8, which are arrangeable in a corresponding component 13.

In particular, it is provided that the tubular sleeve 1 is arranged in a through-opening of the component 13. According to a particularly advantageous embodiment, it can be provided that the tubular sleeve 1 and the component are produced in a 2-component injection-molding process.

In the following, a tubular sleeve 1 according to a fourth exemplary embodiment is briefly described in further detail (FIGS. 7 to 9).

The tubular sleeve 1 according to the fourth exemplary embodiment substantially corresponds to the tubular sleeve according to the first exemplary embodiment, wherein a radially circumferential and radially extending collar 9 is formed in the through-opening 3 for retaining a screw 8.

The collar 9, in conjunction with a correspondingly configured screw, forms an anti-loss or transport-safety feature for a screw.

Furthermore, at an end opposite the contact portion 4, the sleeve 1 comprises an annular stopping portion 24, which extends in radially circumferential direction and extends towards the through-opening. This stopping portion forms an axial limit for a screw 8 received in the through-opening 3.

Figure 10:
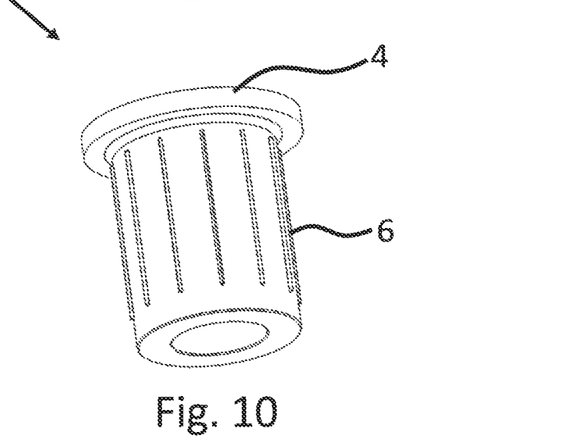
Figure 11:
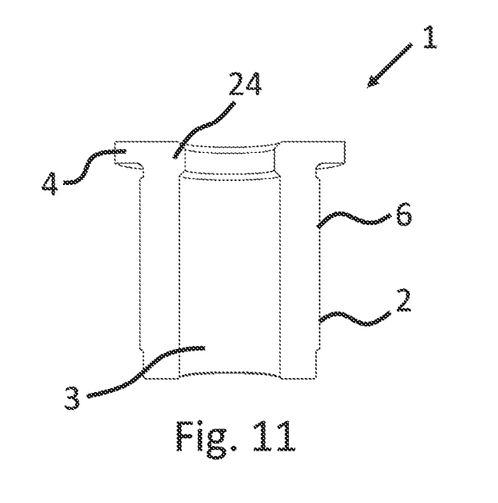

FIGS. 10 and 11 show a tubular sleeve 1 according to a fifth exemplary embodiment, which approximately corresponds to the tubular sleeve 1 according to the first exemplary embodiment.

In addition, the stopping portion 24 is configured in the region of the contact portion 4.

Figure 12:
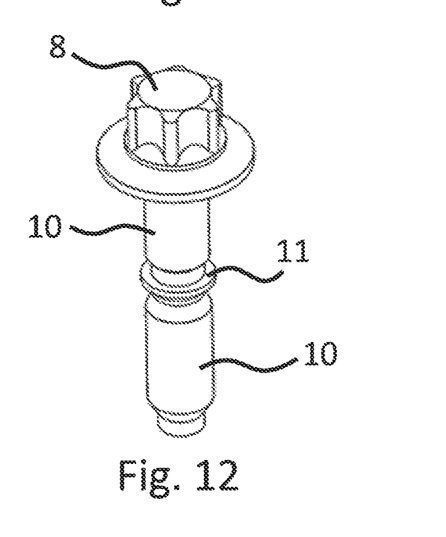
Figures 13, 14, 15:
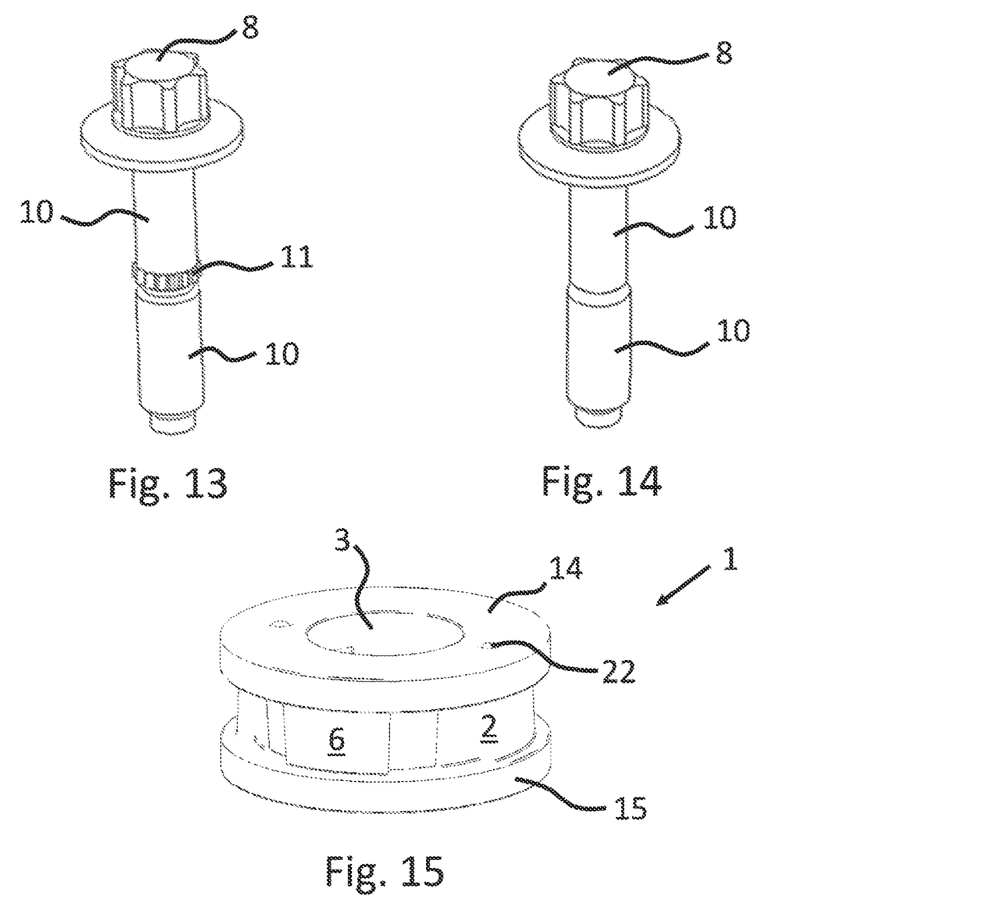

On the screw 8, a portion 11 can be configured having a diameter which is increased relative to the screw shank 10 as an anti-loss feature (FIGS. 12 to 14).

For example, the portion 11 can be formed as a radially extending annular portion 11 (FIG. 12).

Furthermore, the portion 11 can also have a knurling (FIG. 13).

In addition, there is also the possibility that the portion 11 is a portion of the screw shank 10 that has a reduced diameter compared to a threaded portion 12.

In the following, a tubular sleeve 1 according to a sixth exemplary embodiment (FIGS. 15 to 19) is described. To the extent technically possible and unless otherwise described, this tubular sleeve 1, as well as the tubular sleeves 1 described above, can also comprise all technical features of the exemplary embodiments of the present invention described above. The same technical features bear the same reference numerals.

According to the sixth exemplary embodiment, the tubular sleeve 1 is formed from two symmetrically formed sleeve elements 14, 15.

Figure 18:
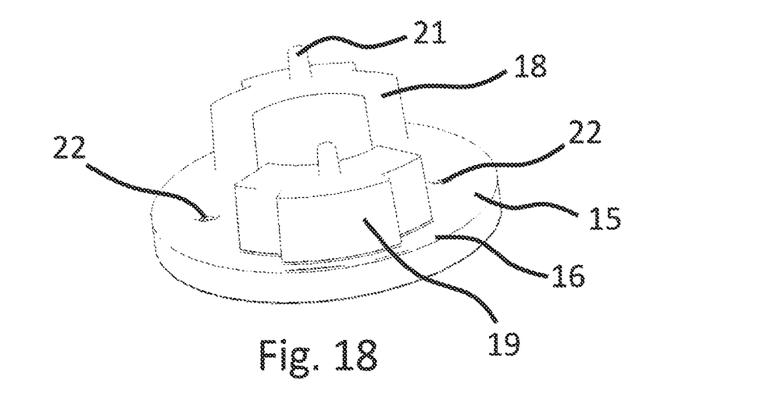

The sleeve elements 14, 15 comprise an annular disc-shaped base wall 16. For example, the base wall 16 can form a contact portion 4 as described above.

Furthermore, the through-opening 3 is formed in the base wall 16.

Figure 19:
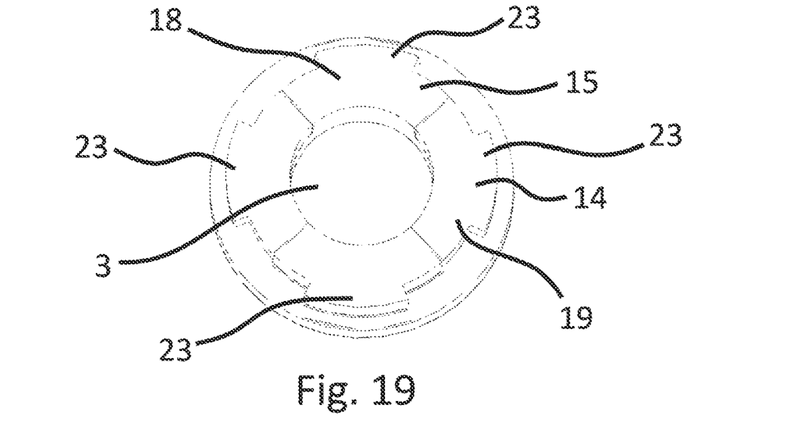

In the region of the passage opening 3, anti-rotation elements 18, 19 extending in an axial direction 17 are diametrically opposed to one another. The anti-rotation elements 18, 19 are configured in a manner that takes an annular, segmented in shape when viewed from above. Each anti-rotation element 18, 19 extends over an angular range of 90°.

Figure 16:
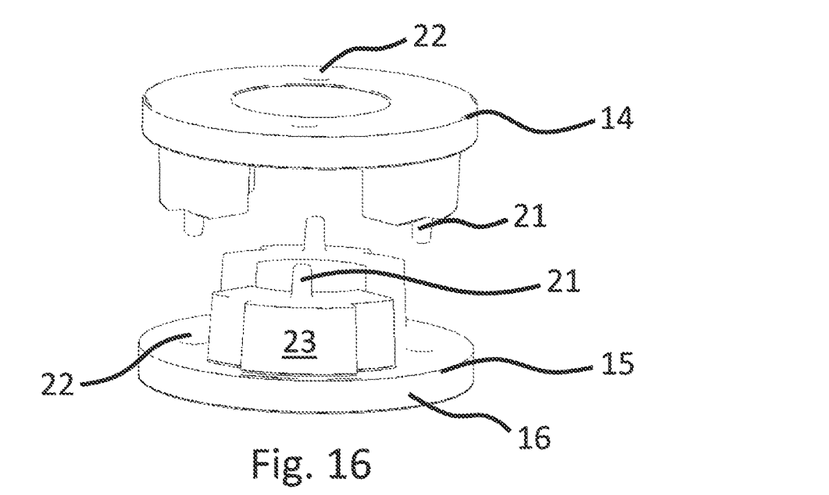
Figure 17:
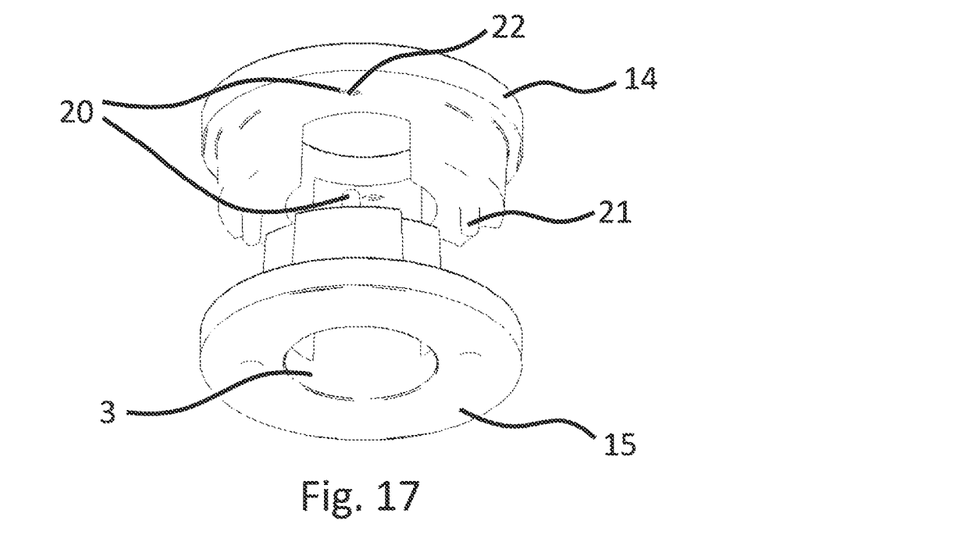

The two sleeve elements 14, 15 can be connected to one another via connecting means in order to form the tubular sleeve 1.

As the connecting means 20, tapered pins 21 or webs having a similar effect can be provided. In the present exemplary embodiment, the connecting means 20 are configured as tapered pins that extend in an axial direction 17 and are integrally formed with the anti-rotation elements 18, 19.

In the annular disc-shaped base wall 15, 16, corresponding connecting recesses 22 are formed in the central region between the two anti-rotation elements 18, 19, said connecting recesses preferably being conically formed.

The connecting recesses 22 are configured correspondingly to the pins 21, wherein a slight interference fit or a predetermined excess is provided in order to connect the two sleeve elements 14, 15 to one another.

Furthermore, the anti-rotation elements 18, 19 can be integrally formed in radially outwardly extending rib portions 23 that have the same technical effect as the ribs 6 described in the above exemplary embodiments.

Furthermore, according to the invention, a method for assembling a component in the engine compartment of a motor vehicle is provided, wherein a sleeve 1 according to the invention is used for the assembly of the component.

In addition, a method for producing a component is provided in a 2-component injection-molding process, wherein a sleeve according to the invention is firstly produced by means of a first injection-molding process and subsequently, by over-molding the casing wall 2 of the tubular sleeve 1, a component 13 is formed at least regionally or also completely.

LIST OF REFERENCE NUMERALS

1 Tubular sleeve
2 Casing wall
3 Through-opening
4 Abutting portion
5 Axial direction
6 Ribs
7 Fastening system
8 Screw
9 Collar
10 Screw shank
11 Portion
12 Thread
13 Component
14 Sleeve element
15 Sleeve element
16 Base wall
17 Axial direction
18 Anti-rotation element
19 Anti-rotation element
20 Connecting means
21 Pins
22 Connecting recess
23 Rib portion
24 Stopping portion

The invention claimed is:

1. A tubular sleeve, for use as a force-absorbing sleeve, having a casing wall and a through-opening, wherein the sleeve is formed from plastic, and the plastic has a modulus of elasticity between 15000 MPa and 25000 MPa;
wherein the sleeve is formed in two parts from two identical sleeve elements;
wherein each of the sleeve elements comprises an annular disc-shaped base wall and diametrically opposed anti-rotation elements extending axially from the annular disc-shaped base wall, wherein the annular disc-shaped base wall includes diametrically opposed connecting recesses, wherein each anti-rotation element includes a free end from which a connecting pin axially extends such that two connecting pins are provided on each sleeve element;
wherein the sleeve elements are connected together by engagement of the connecting pins into the connecting recesses.

2. The tubular sleeve according to claim 1,
wherein
the sleeve is resistant to heat deformation in a temperature range of −40° C. to 125° C.

3. The tubular sleeve according to claim 1,
wherein
the plastic is a semi-aromatic polyamide.

4. A fastening system comprising the sleeve according to claim 1 and a screw having a screw size between M5 and M8, the screw engaged in the through-opening.

5. The fastening system according to claim 4,
wherein
a portion having a diameter enlarged opposite the screw shank is configured on a screw shank of the screw as an anti-loss feature, wherein the portion comprises a knurling or a ring element or a thread.

6. A method for assembling a component in an engine compartment of a motor vehicle, wherein a sleeve according to claim 1 is used for assembling the component.

7. A method for producing a component in a 2-component injection-molding process, wherein firstly a sleeve according to claim 1 is injection-molded with ribs extending in the axial direction of the sleeve on an outer side of the casing wall, and thereafter the sleeve is over-molded in the region of the ribs, in order to position the sleeve securely on a component.

8. The tubular sleeve of claim 1, wherein the connecting pins connect into the connecting recesses via an interference fit.

9. The tubular sleeve of claim 1, wherein the connecting pins are located radially outward of the through-opening, wherein the connecting recesses are located radially outward of the through-opening.

10. The tubular sleeve of claim 1, wherein, for each sleeve element, the free end of each anti-rotation element engages against an axially facing surface of the annular disc-shaped base wall of the other sleeve element, wherein the axially facing surfaces of the annular disc-shaped base walls face toward each other.

11. The tubular sleeve of claim 1, wherein, for each sleeve element, each anti-rotation element includes a radially outwardly extending rib portion extending along a full axial length of the anti-rotation element.

12. A tubular sleeve, for use as a force-absorbing sleeve, having a casing wall and a through-opening, wherein the sleeve is formed from plastic;
wherein the sleeve is formed in two parts from two identical sleeve elements;
wherein each of the sleeve elements comprises an annular disc-shaped base wall and diametrically opposed anti-rotation elements extending axially from the annular disc-shaped base wall;
wherein, for each sleeve element, the free end of each anti-rotation element engages against an axially facing surface of the annular disc-shaped base wall of the other sleeve element, wherein the axially facing surfaces of the annular disc-shaped base walls face toward each other;
wherein, for each sleeve element, the annular disc-shaped base wall includes at least one connecting recess and the free end of at least one of the anti-rotation elements includes an axially extending pin,
wherein the sleeve elements are connected together by engagement of the connecting pins into the connecting recesses.

13. The tubular sleeve of claim 12, wherein the connecting pins are located radially outward of the through-opening, wherein the connecting recesses are located radially outward of the through-opening.

14. The tubular sleeve of claim 13, wherein the connecting pins connect into the connecting recesses via interference fit.

15. A tubular sleeve, for use as a force-absorbing sleeve, having a casing wall and a through-opening, wherein the sleeve is formed from plastic;
   wherein the sleeve is formed in two parts from two identical sleeve elements;
   wherein each of the sleeve elements comprises an annular disc-shaped base wall and diametrically opposed anti-rotation elements extending axially from the annular disc-shaped base wall,
   wherein, for each sleeve element, each anti-rotation element includes a radially outwardly extending rib portion extending along a full axial length of the anti-rotation element.

* * * * *